Figure 1:
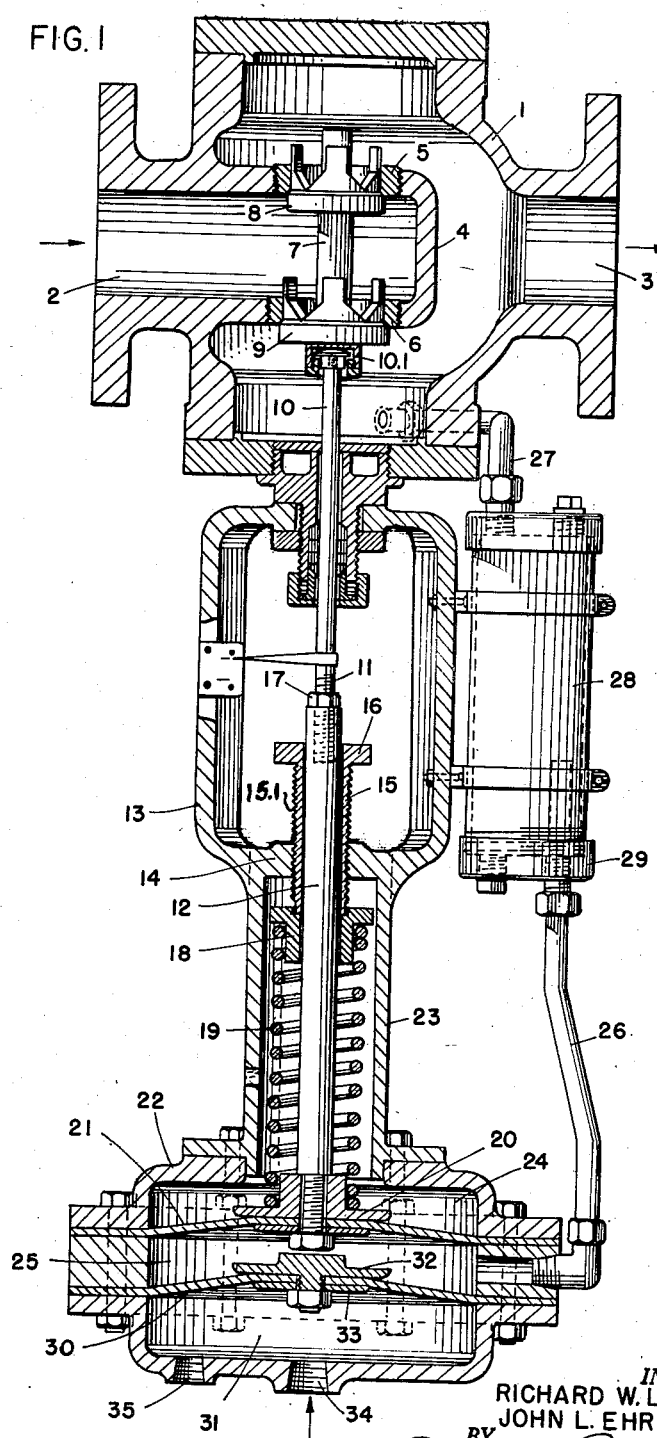

United States Patent Office 2,833,303
Patented May 6, 1958

2,833,303

CONTROL AND PRESSURE REGULATING VALVE

Richard W. Leutwiler and John L. Ehretsman, Chicago, Ill., assignors, by mesne assignments, to American Air Filter Co. Inc., Louisville, Ky., a corporation of Delaware Application January 22, 1953, Serial No. 332,604

1 Claim. (Cl. 137—495)

This invention relates to steam valves for controlling the supply and pressure of steam to continuous flow heating systems. These systems have supply and return pipes leading to and from the radiators and are of a type wherein each heating zone is controlled by a fluid operated valve, that adjusts the steam supply to current requirements.

The main objects of the present invention are to provide an improved form of steam supply and pressure control valve adapted to be readily adjusted for automatic operation in systems operating with pressures at, above or below atmospheric pressure, and which will be responsive automatically both to fluctuations in discharge pressure in the valve discharge and to fluid control regulated by remote manual, thermostatic or other means; to provide an improved arrangement of motor means for actuating such valves; and to provide an improved form of diaphgram motor mechanism for utilizing both pressure in the system and auxiliary fluid pressure for regulating the valve.

A specific embodiment of this invention is shown in the accompanying drawing, which is a vertical section through the valve and its operating mechanism.

In the form shown the valve body 1 has an inlet or supply branch 2, adapted to be connected with the source of steam under pressure, and an outlet or feed branch 3 adapted to be connected to the feed pipe of a two-pipe heating system. The interior of the valve has a partition 4 of U-shape separating its supply and delivery branches and having a pair of axially aligned valve ports 5 and 6 for a floating semi-balanced double piston valve 7, comprising two spaced valve disks 8 and 9 with cylindrical flanges of V-port type coacting respectively with valve seats at ports 5 and 6 to regulate the divided flow through the valve as will be understood. The valve disk 9 is of slightly larger diameter than disk 8, so that the valve is normally urged by the pressure thereon to an open position but is partly balanced by counterpressure. The stem 10 is connected to the valve by a semi-flexible joint 10.1 and is threaded at 11 adjacent its outer or lower end for telescoping adjustable connection to a stem extension portion 12.

The frame for the regulating and control mechanism comprises a yoke 13 attached to the bottom of the valve body and extending along the stem 10 to a transverse part 14 in which there is threaded a guide sleeve 15 for the stem extension 12. This sleeve has a head 16, and a threaded shank 15.1. The yoke 13 is of open skeleton form at its upper portion to permit of ready access to the head 16 and the lock nut 17. The sleeve 15 bears at its lower end on an adjustable spring follower head 18 bearing against a compression spring 19 that surrounds the stem extension 12 and bears against a diaphragm plate 20 that is secured to the end of the extension 12. The plate 20 is attached to a diaphragm 21 mounted in a housing 22. The yoke 13 has a tubular lower portion 23 that forms a housing for the spring 19 and carries the diaphragm housing 22.

The housing 22 is divided, by a pair of spaced diaphragms having exactly equal exposed areas, into three chambers, an upper chamber 24, an intermediate chamber 25 and a lower chamber 31. The chamber 24 is open to the air. The intermediate chamber 25 is connected by pipes 26 and 27 to the interior of the valve body 1 at the delivery side of the valve. Interposed between the pipes 26 and 27 there is a vessel 28 that serves as a water reservoir for maintaining a supply of water in the chamber 25, and also serves as a trap for preventing sediment from passing into the chamber 25. To this end the vessel 28 is somewhat larger in diameter than the piping. The pipe 27 enters the upper end of the vessel 28 and the pipe 26 extends through the lower cap 29 and terminates a substantial distance above this cap. Plugs at the top and bottom of vessel 28 are for filling and emptying the vessel when required.

The housing 22 has a second diaphragm 30 that is separated from the diaphragm 21 by a spacer ring that forms part of the housing 22. Diaphragm 30 separates the chamber 31 from the chamber 25. The diaphragm 30 has plates 32 and 33 clamped together at its center in line with the valve stem 11—12, but not connected thereto. The lower wall of the lower chamber 31 has a tapped bore 34 which serves as a port for connecting this chamber with a fluid pressure line for thermostatic or remote manual control of the valve by varying the pressure within the chamber 31. The second tapped opening 35 is for connection to a pressure gauge.

In service, the inlet branch 2 of the valve is connected to the steam supply source of the steam heating system, the outlet branch 3 is connected to the radiator supply main and the port 34 of the diaphragm motor housing 22 is connected to a source of fluid pressure, such as an air compressor and pipe-line (not shown). Suitable arrangements of heating systems with thermostatic and manual control devices for fluid control of steam valves are so well known in the art, that for disclosure of this invention, it is deemed unnecessary to illustrate specific examples of such systems and means for supplying varying fluid pressure to the chamber 31.

In the semi-balanced V-port type of valve shown, the piston disk 9 is of slightly larger diameter than the disk 8, so that the steam pressure at the inlet branch 2 tends to urge the valve to an open position. The spring 19 bearing between the frame part 14 and the diaphragm 21, also tends to urge the valve piston 7 toward an open position. The thrust of the spring 19 is adjusted by means of the sleeve 15 in its threaded relation to the part 14 of the frame. Pressure is the outlet branch 3 is transmitted through pipe 27, reservoir 28, pipe 26 and the water in the chamber 25 to the motor diaphragms 21 and 30. When the demand is substantially constant these pressures cause the valve 7 to maintain a rate of flow that is equivalent to a circulatory flow of steam sufficient to maintain a proper supply of steam to the radiators.

The control diaphragm 30 is entirely separate from the diaphragm 21 and the valve stem, but an increase of fluid pressure in the chamber 31 under the action of automatic or manual control, causes the diaphragm 30 to move upward into engagement with the valve stem to urge the valve 7 toward a closed position.

The primary purpose of this control and pressure regulating valve is to provide means for automatically regulating the pressure and flow of steam to a low pressure steam heating system operating at, above, or below atmospheric pressure.

Regulation of steam pressure at the valve outlet 3, is accomplished by obtaining and maintaining through the reservoir 28 a pressure on the lower side of the pressure regulating diaphragm 21 to balance the compression of the adjusting spring and the downward pressure caused by the inlet steam pressure acting upon the unbalanced areas of the valve piston.

Remote control of the flow of steam is accomplished by introducing varying fluid pressures into the lower chamber 31 of the diaphragm assembly, thus forcing the control diaphragm 30 and piston 7 upward to a throttling position.

In all low pressure steam heating systems the load, or steam consumption, varies in accordance with changes in outdoor temperatures. Such changes in load may be due to radiator valves being opened or closed by occupants of the heated space or to opening or throttling action by individual automatic radiator control valves, or to varying demands caused by automatic or manual control of the fluid pressure in chamber 31.

This control and pressure regulating valve 7 positions itself automatically to accommodate such changes in load, increasing or decreasing the flow of steam and maintaining an outlet pressure not exceeding the maximum pressure for which the valve has been initially set by adjusting the pressure of spring 19.

*Valve operation at or above atmospheric pressure*

Assume a steam inlet pressure on the valve of ten pounds gauge.

By compressing the adjusting spring 19, by means of the adjusting screw 15, an outlet pressure from zero to five pounds gauge may be obtained and maintained under full load conditions.

If the load should decrease, the valve automatically will position itself to maintain the maximum discharge pressure for which it has been adjusted, in the following manner: As the load is decreased, this discharge pressure tends to increase and this increase acting through the control reservoir 28, on the lower side of the steam pressure control diaphragm 21, causes this diaphragm, acting through the valve stem, to move the piston 7 toward the seat thus throttling the flow of steam.

The introduction of varying fluid pressures into the diaphragm assembly, below the fluid control diaphragm 30, forces this diaphragm upward against the lower end of the valve stem, thus throttling the steam flow through the valve, and reducing the discharge pressure of the valve, in proportion to the amount of fluid pressure introduced.

Fluid pressures in chamber 31 can be controlled by controlling the fluid supply manually, or by means of automatic devices such as thermostats, aqua-stats and the like.

*Valve operation below atmospheric pressure*

Heating systems designed to operate at less than atmospheric pressure are equipped with a device attached to the return pipe system, such as a vacuum pump, capable of producing and maintaining a vacuum up to 25 or more inches of mercury in the entire system.

Assume, for example, that the control and pressure regulating valve is in service, adjusted as previously described for an outlet pressure of one pound gauge at maximum load.

Any vacuum in the discharge causes the diaphragms to draw together because of the fact that the upper diaphragm is subject to atmospheric pressure above and the control pressure below the lower diaphragm will never be less than atmospheric pressure. Therefore, since both diaphragms in effect form a solid unit with the stem, fluctuations in the vacuum at the discharge outlet of the valve have no effect on the position of the valve piston. The stem is motivated then only by changes in the control pressure on diaphragm 30.

Application of varying fluid pressures under the control diaphragm 30 produces corresponding throttling of both steam pressure and steam flow.

As this fluid pressure is increased, the discharge steam pressure of the valve is reduced approximately to the vacuum or low absolute pressure produced by the pump. This low pressure is transmitted through the control reservoir to the space between the two diaphragms in the assembly, drawing them together and forming, in effect, a solid connection between the lower control diaphragm and the valve piston. By this means any variation in the pressure of the control fluid on the control diaphragm 30 transmits movement to the piston positively and accurately.

Therefore if the control fluid pressure is maintained at a fixed amount, the valve piston will be positioned correspondingly at constant load.

Further, if the control fluid pressure is increased or decreased in increments, the valve piston will be moved correspondingly.

Although but one specific embodiment of this invention is herein shown and described, it will be understood that numerous details of the construction shown may be altered or omitted without departing from the spirit of the invention as defined by the following claim.

We claim:

A device for regulating the flow of a fluid from a main supply line having a relatively high super-atmospheric pressure to a secondary line having a lower working pressure, which may vary over a pressured range extending from atmospheric pressure upwardly through a super-atmospheric pressure section and downwardly through a sub-atmospheric pressure section, comprising: a valve body having a movable valve member controlling the flow of fluid from the main line to the secondary line; pressure regulating means normally operative to hold the secondary line working pressure at a selected super atmospheric value by automatically adjusting the position of said valve member in response to fluctuations in the working pressure from said selected value, said pressure regulating means including a control diaphragm operatively connected to said valve member and urged by a biasing means in the valve opening direction and which is acted upon on one side by the working pressure, a super atmospheric pressure urging it in the valve closing direction and an override diaphragm of a size substantially equal to that of the control diaphragm normally subject to a super atmospheric working pressure on one side and an outside atmospheric fluid pressure on the other side and normally held, by the pressure differential across it, in an inactive position in which it is operatively disconnected from said valve member; said override diaphragm being arranged to move into operative engagement with said valve member when the pressure differential across it reverses its direction; a hollow housing member co-operating with said control and override diaphragms to form a closed chamber therebetween; said closed chamber being subject to said secondary line working pressure so as to urge said diaphragms apart under super atmospheric pressure conditions and to collapse them toward each other under sub atmospheric pressure conditions, the said override diaphragm being operable, when moved into operative engagement with said valve member to prevent the normal regulating operation of said pressure regulating means and to convert the device into a means for throttling the valve progressively as the outside fluid pressure is progressively increased above atmospheric pressure.

References Cited in the file of this patent

UNITED STATES PATENTS

| | | |
|---|---|---|
| 2,026,704 | Petroe | Jan. 7, 1936 |
| 2,162,779 | Leutwiler | June 20, 1939 |
| 2,272,815 | Otto | Feb. 10, 1942 |
| 2,309,848 | King | Feb. 2, 1943 |
| 2,312,191 | Reader | Feb. 23, 1943 |
| 2,573,680 | Arnold | Nov. 6, 1951 |